United States Patent
Zapf (10) Patent No.: US 12,377,799 B2
(45) Date of Patent: Aug. 5, 2025

(54) VEHICLE EQUIPMENT PART AND USE OF A GUIDE PART TO AN ELECTRIC WIRE IN AN EQUIPMENT PART

(71) Applicant: GRAMMER AG, Ursensollen (DE)

(72) Inventor: Sebastian Zapf, Neustadt a. d. Waldnaab (DE)

(73) Assignee: GRAMMER AG, Ursensollen (DE)

( * ) Notice: Subject to any disclaimer, the term of this patent is extended or adjusted under 35 U.S.C. 154(b) by 392 days.

(21) Appl. No.: 18/101,219

(22) Filed: Jan. 25, 2023

(65) Prior Publication Data
US 2023/0256921 A1    Aug. 17, 2023

(30) Foreign Application Priority Data
Feb. 11, 2022    (DE) .................... 10 2022 103 314.7

(51) Int. Cl.
*B60R 16/02*    (2006.01)
*B60N 2/75*    (2018.01)
*B60R 16/08*    (2006.01)

(52) U.S. Cl.
CPC .......... *B60R 16/0215* (2013.01); *B60N 2/767* (2018.02); *B60N 2/793* (2018.02); *B60R 16/08* (2013.01)

(58) Field of Classification Search
CPC ...... B60R 16/0215; B60N 2/797; B60N 2/793
USPC ..................................................... 296/24.34
See application file for complete search history.

(56) References Cited

U.S. PATENT DOCUMENTS

| | | | |
|---|---|---|---|
| 10,941,540 B2 * | 3/2021 | Wallgren | .................. G05G 1/62 |
| 2020/0353853 A1 * | 11/2020 | Kuhlmann | ............. B60N 2/767 |
| 2022/0250519 A1 | 8/2022 | Yamamoto | |

FOREIGN PATENT DOCUMENTS

| | | |
|---|---|---|
| DE | 10151707 C1 | 4/2003 |
| DE | 102004059009 A1 | 6/2006 |
| DE | 102006054120 A1 | 5/2008 |
| DE | 102007054952 A1 | 5/2009 |
| DE | 202013007807 U1 | 12/2014 |
| DE | 102020111742 A1 | 11/2021 |
| GB | 2519425 A | 4/2015 |
| JP | 6917320 B2 | 8/2019 |
| JP | 2019188994 A | 10/2019 |
| KR | 20100030428 A * | 3/2010 |
| WO | 2020184274 A1 | 9/2020 |

OTHER PUBLICATIONS

Excerpt of German examination report of Sep. 19, 2022 in Application DE 10 2022 103 314.7, 1 page.

* cited by examiner

*Primary Examiner* — Joseph D. Pape
(74) *Attorney, Agent, or Firm* — LUCAS & MERCANTI, LLP; Klaus P. Stoffel (57) ABSTRACT

An equipment part for a vehicle having a base and having a pivot part which can be pivoted relative to the base about a pivot axis between a first position and a second position and forms a pivot joint with the base, and having at least one line between the base and the pivot part, which line includes a first portion associated with the base and a second portion associated with the pivot part. A guide device for the line includes a first part fixed to the pivot part and forming a first connection with the first portion, as well a second part fixed to the base and forming a second connection with the second portion, wherein between the first connection and the second connection the line forms a line store.

13 Claims, 9 Drawing Sheets

VEHICLE EQUIPMENT PART AND USE OF A GUIDE PART TO AN ELECTRIC WIRE IN AN EQUIPMENT PART

CROSS-REFERENCE TO RELATED APPLICATIONS

The present application claims priority of DE 10 2022 103 314.7, filed Feb. 11, 2022, the priority of this application is hereby claimed and this application is incorporated herein by reference.

BACKGROUND OF THE INVENTION

According to a first aspect, the invention relates to an equipment part for a vehicle. Such an equipment part is, for example, an armrest with a pivotable and/or slidable arm support or the pivotable and/or slidable cover of a storage compartment in a console. With such equipment parts, it is often necessary to guide lines between the movable part and the fixed base of the equipment part, e.g. in order to provide power to the movable part or to be able to transmit data.

Such an equipment part is known from DE 20 2013 007 807 U1 in the form of a storage compartment with cover. Here, a control element is connected to the vehicle-mounted communication means by means of a cable. A cable loop is provided to compensate for movement of the cover relative to the center console.

DE 10 2020 111 742 A1 discloses a connection device for a vehicle. The connection device comprises a cable having a first end electrically connected to at least one component of the vehicle. A second end of the cable is adapted to be electrically connected to a mobile terminal of a user of the vehicle. A portion of the cable present between the first end portion and the second end portion is transferable to a first state and to a second state. This is possible, for example, by winding or unwinding the cable onto a reel.

WO 2020/184274 A1 discloses an equipment part in the form of an armrest. The armrest comprises a frame and a mounting unit having a mounting surface provided on the frame and to be mounted on a bracket of a seat. An armrest-side harness with a connector is wired to the frame, and the connector is connectable to the seat-side harness.

JP 6 917 320 B2 discloses an armrest with a pivotable arm support, wherein a cable is guided between a vehicle seat and the arm support. The cable has a portion with excess length, which is deformed when the arm support is pivoted.

In the armrest according to JP 2019 188 994 A, a cable is guided between a vehicle seat and a pivotable arm support. The cable runs inside a tubular pivot axis.

A disadvantage of the aforementioned equipment parts with a cable guide between a fixed base and a movable part is the fact that the cable is twisted when the pivot part moves, and in some devices, there is a free cable area which can get caught or impair the function of the equipment part and has to be covered at great expense due to the spatial expansion.

SUMMARY OF THE INVENTION

It was the object of the invention to provide an equipment part with a line guide between a base and a pivot part of the equipment part, in which the line is only subject to minor deformations.

The equipment part is provided for a vehicle. For the purposes of the invention, vehicle means a land, air or water vehicle. The equipment part comprises a base and a pivot part pivotable relative to the base between a first position and a second position about a pivot axis, the pivot part forming a pivot joint with the base.

At least one line guides between the base and the pivot part. For example, the line is used for power supply or data transmission. The line is, for example, a single-core or multi-core cable. For example, the line comprises one or more sheathed metal or fiber optic cores.

A guide device for the line comprises a first part fixed to the pivot part and a second part fixed to the base. A relative movement in the form of a pivoting movement about the pivot axis a is possible between the first part and the second part.

A first portion of the line forms a first connection with the first part. A second portion of the line forms a second connection with the second part. The line is substantially immovably attached to the respective part by the connection. Between the connections, the line forms a line store or line reserve in the sense of a line surplus. The length of the line in the line store is constant. In the region of the excess line, the line is, for example, at least partially spirally wound. It can be moved between at least one position with narrower winding and one position with wider winding, changing the number of windings. A radial gap then changes between the individual windings. The number of windings is, for example, at least 1, preferably about 3 to 6 windings.

According to an alternative solution, the line is laid in loops in the area of the excess line, e.g. in a meander shape.

In a first position of the pivot part, the line in the line store comprises, for example, a first number of windings, wherein a first distance is formed radially between the windings of the line. In a second position of the pivot part, the required line length is, for example, greater. A second distance is formed between the conductors. The line store comprises a second number of windings. An additionally required line length or an excess line length is compensated by the line store, e.g. by changing the number of turns of the spiral winding.

The advantage of the invention is that the line is only slightly deformed during the movement of the pivot part and in this way is not subject to strong alternating deformations. In the case of a spiral winding, for example, only the number of turns changes depending on the pivot angle of the pivot part. The deformation due to the pivotable of the pivotable part is distributed, for example, over a large line length in the line store. The service life of the line is therefore extended. In addition, the line store can be made relatively small, so that the effort required to cover the line is reduced.

The line store is formed, for example, as a spiral winding. The winding is formed, for example, around the pivot axis as a center.

The line is, for example, an electrical line, a light cable or a compressed air line. Other conceivable lines may also be used alternatively in the invention.

For example, the cable is designed as a ribbon cable. A ribbon cable is well suited for uniform winding and takes up little space. Alternatively, however, round cables are also suitable for carrying out the invention, for example.

The guide device forms, for example, a housing in which the line store is accommodated. Portions of the line of the line store can then not move undesirably out of the desired position and interfere with the movement of the pivot part or suffer damage due to the movement of the pivot part. The housing is designed in such a way that the movements of the line store due to the change in the line requirement can take place within the housing.

In particular, the first part and the second part form the housing.

The housing has, for example, a circular cylindrical shape. It corresponds, for example, approximately to the shape of the line store and therefore takes up little space. For example, the first part and/or the second part is shell-shaped. The line store can then be easily accommodated and secured in the shell-shaped part.

For example, the armrest-side portion and the base-side portion exit the housing through at least one opening. Preferably, each part comprises an opening and the first area exits from an opening of one part and the second area exits from an opening of the other part. In the region of the opening, for example, the connection of the line to the respective part may be arranged. For example, the line exits the housing axially, that is, parallel to the pivot axis. According to an alternative embodiment, the line can also exit the housing radially.

One of the parts, the first part or the second part is immovable relative to the vehicle body or to a vehicle reference, for example. The other part is then moved relative to the stationary part when the pivot part is moved. This simplifies the design and reduces wear on the equipment part. In addition, there is a defined relative movement between the first and second parts so that noise due to the relative movement can be better avoided.

The second part can be pivoted, for example, relative to the first part about the pivot axis. In the area of the pivot axis, the difference in cable length to be released or stored between the end positions of the pivot part is the smallest. In addition, a relative movement of the first part and the second part can easily take place at this point by connecting one part to the pivot part and the other part to the base.

The equipment part is, for example, an armrest or a pivotable cover of a storage compartment of a console of the vehicle.

According to a second aspect, the invention relates to the use of a guide part for a line in an equipment part for a vehicle.

Reference is made to the prior art cited with respect to the first aspect of the invention.

The guide part includes a first part forming a first connection with a first portion of the line, and a second part forming a second connection with a second portion of the line. Between the first connection and the second connection, the line forms a line store. The line store comprises a defined length portion of the line. In the line store, the line forms an excess.

The use of the guide part relates to an equipment part for a vehicle. The equipment part comprises a base and a pivot part pivotable relative to the base between a first position and a second position about a pivot axis, which pivot part forms a pivot joint with the base. Further, the equipment part comprises at least one line between the base and the pivot part, which line comprises a first portion associated with the base and a second portion associated with the pivot part.

The equipment part is an armrest with a pivotable arm support or a storage compartment with a pivotable cover.

With respect to the embodiments and advantages of the invention, reference is made to the first aspect of the invention.

Examples of embodiments of the invention are described by way of example in the following description of the figures, also with reference to the drawings. For the sake of clarity—also insofar as different embodiment examples are concerned—identical or comparable parts or elements or portions are designated with the same reference characters, sometimes with the addition of small letters.

Features described only in relation to one embodiment may also be provided in any other embodiment of the invention within the scope of the invention. Such modified embodiments—even if not shown in the drawings—are included in the invention.

All disclosed features are essential to the invention in themselves. The disclosure of the application hereby also fully incorporates the disclosure content of the associated priority documents (copy of the prior application) as well as the cited printed matter and the described prior art devices, also for the purpose of including individual or several features of these documents in one or several claims of the present application.

DETAILED DESCRIPTION OF THE INVENTION

Figure 1A:
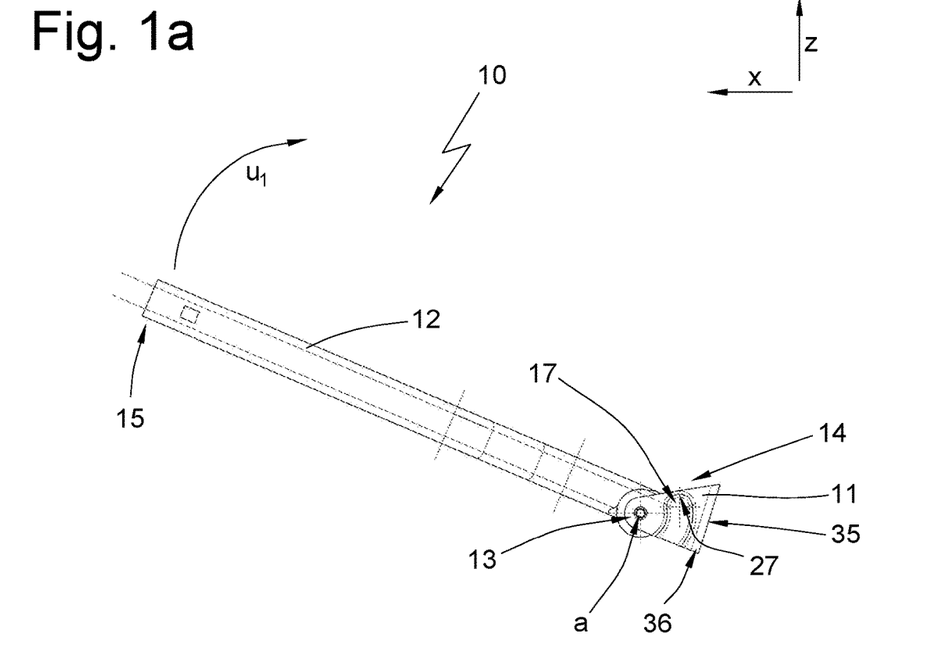
FIG. 1a a side view of an equipment part in the form of an armrest with base and pivot part, wherein the pivot part is in a first position, which in this case is an approximately horizontal position, FIG. 1b a perspective view of the pivot part according to FIG. 1a from diagonally in front, FIG. 2 a side view as shown in FIG. 1a, with the base not shown for clarity, FIG. 3 a perspective view of the pivot part with guide device according to FIG. 2, FIG. 4, a side view according to FIG. 2, with the pivot part moved to a second, upper position, FIG. 5 a perspective view of the pivot part according to FIG. 4, FIG. 6 a side view of the guide part in the first position of the arm support, FIG. 7 a view of the guide part according to arrow A in FIG. 6, FIG. 8 a sectional view of the guide part according to section line B-B in FIG. 6, FIG. 9a a perspective view of the guide part according to FIG. 6, with the pivot part in the first position, FIG. 9b a side view of the guide part according to FIG. 9a, where the first part is not shown so that a line store can be seen, FIG. 10a a perspective view of the guide part according to FIG. 9a, with the pivot part in the second position, FIG. 10b a side view of the guide part according to FIG. 9b, with the pivot part in the second position, FIG. 11 a perspective view of the guide part according to FIG. 9b, FIG. 12 a perspective view of the guide part according to FIG. 10b, wherein the first portion and the second portion are indicated by a dashed line only.
Figure 1B:
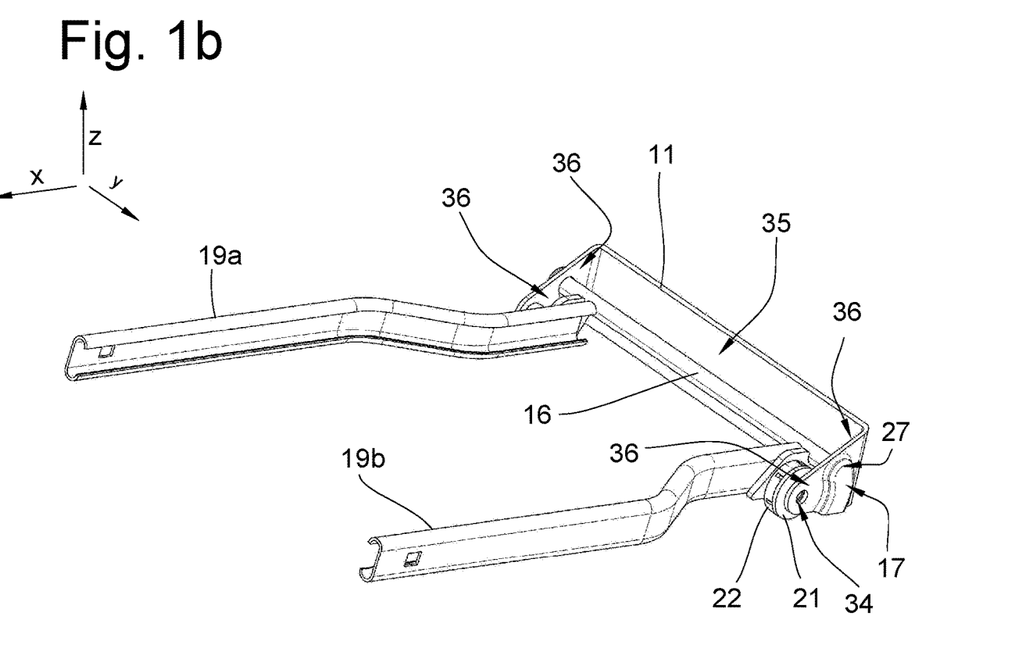
Figure 2:
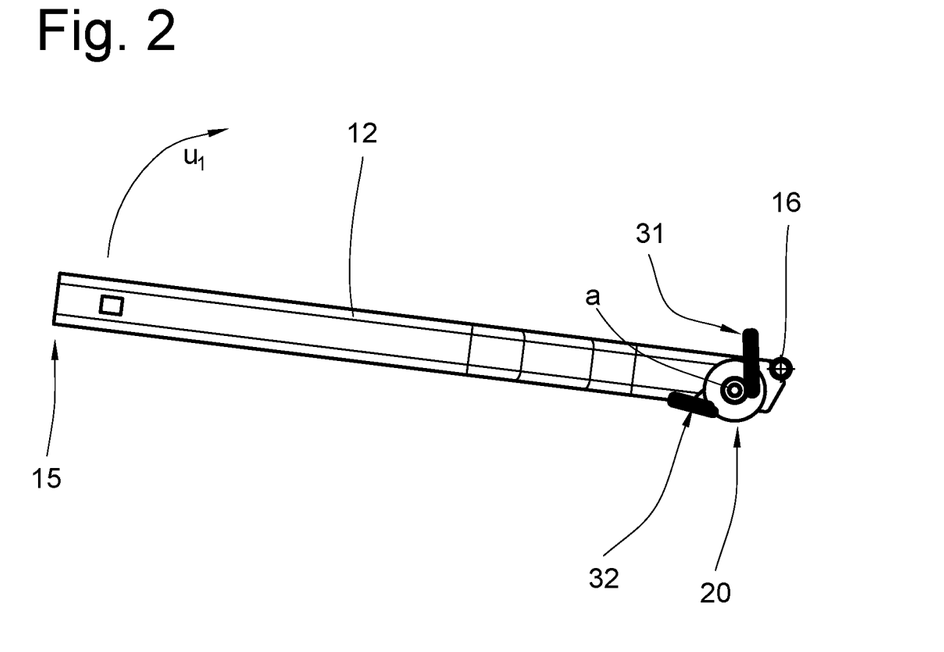
Figure 3:
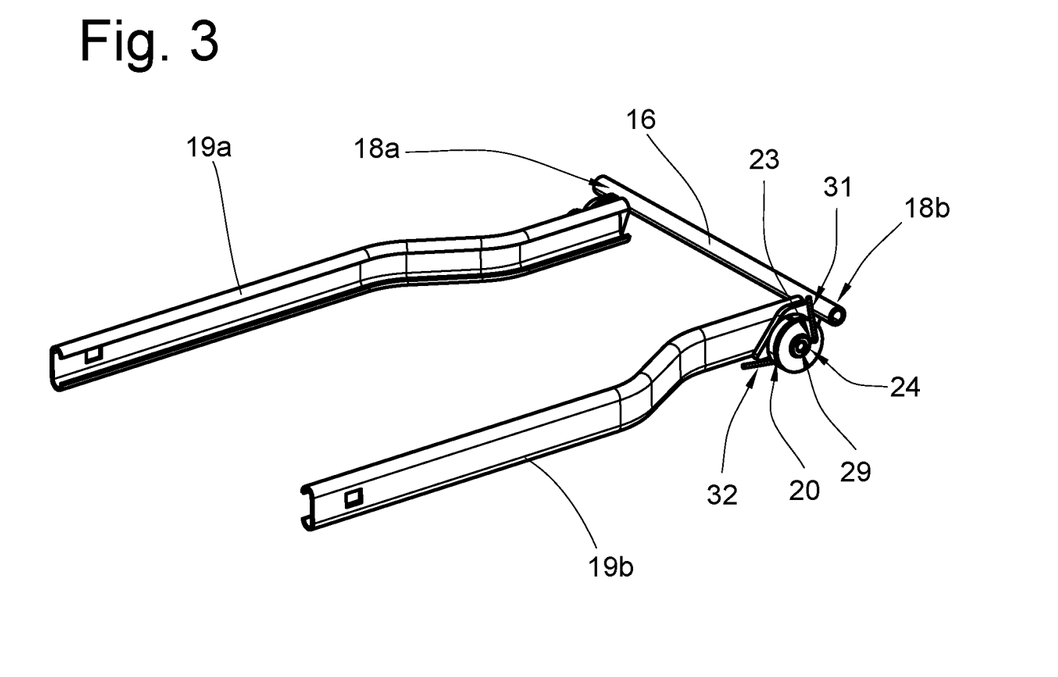
Figure 4:
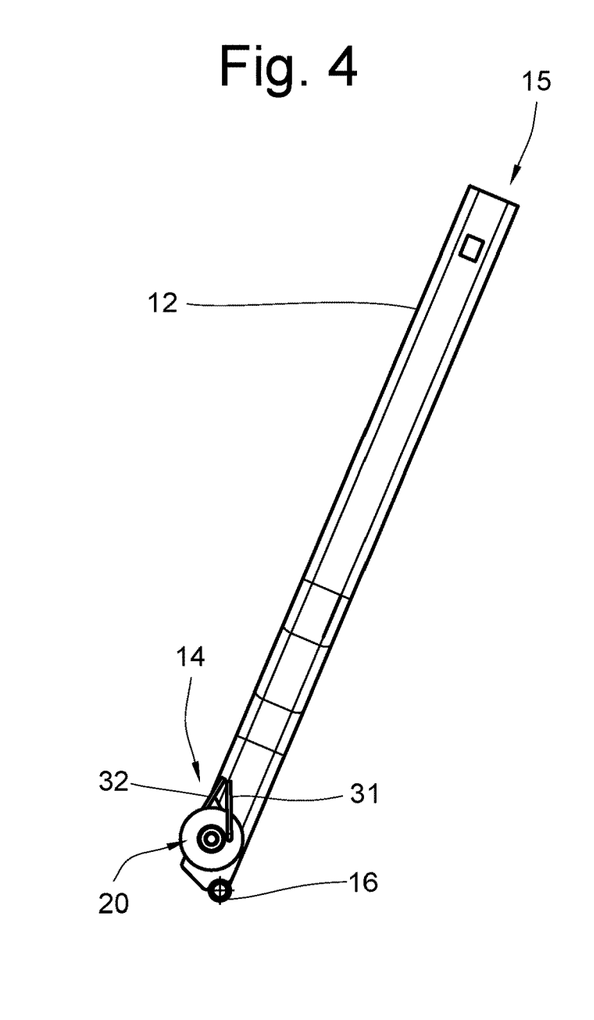

FIG. 1 and FIG. 4 show an equipment part 10 for a vehicle, which comprises a base 11 and a pivot part 12. In the present embodiment, the equipment part 10 is an armrest with a base 11 fixed to the body, and the pivot part 12 is an arm support that can be pivoted relative to the base 11. The pivot part 12 forms a pivot joint 13 with the base 11 with the pivot axis a. Here, the base 11 is in the form of a retaining clip or U-shaped. The base 11 is formed by a sheet metal member having a central region 35, with end regions being angled forward at approximately right angles to the central region 35. Recesses 34 are arranged in the angled regions 36.

The pivot part 12 is pivotable about the pivot axis a relative to the base 11 between a first position and a second position. The first position (see FIGS. 1a, 1b, 2 and 3) is an approximately horizontal position in which a longitudinal central axis of the pivot part 12 is arranged e.g. parallel to or e.g. deviating by up to 30° from an x-axis. The x-axis is part of a common coordinate system comprising an x-axis, a y-axis and a z-axis according to FIGS. 1a and 1b.

Figure 5:
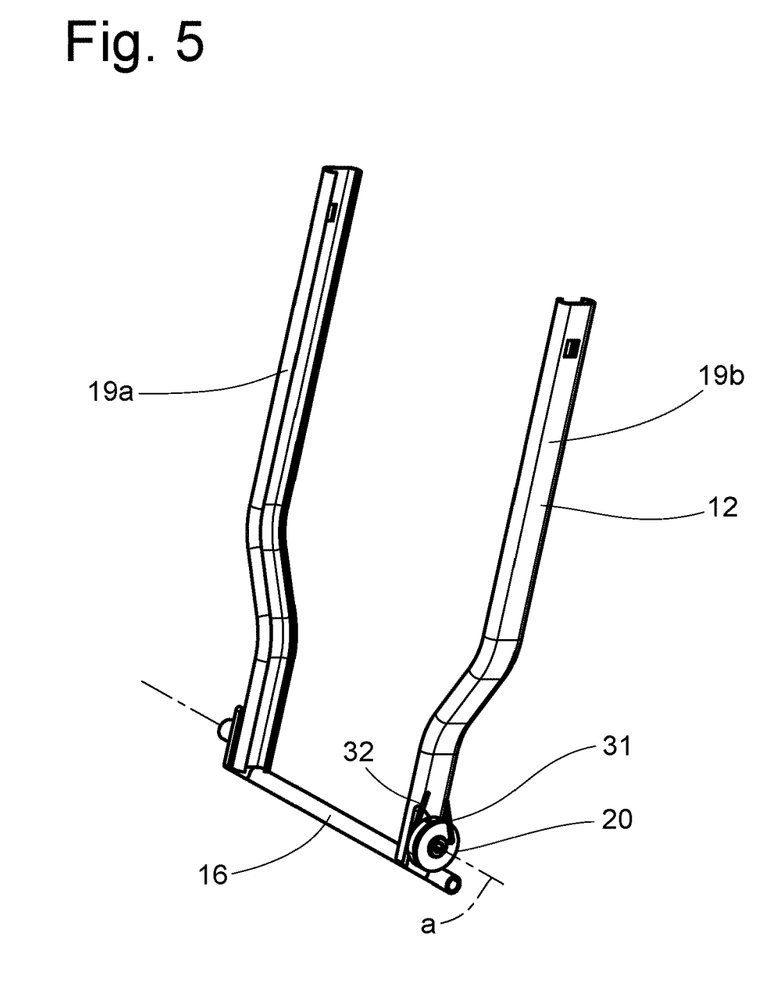
Figure 6:
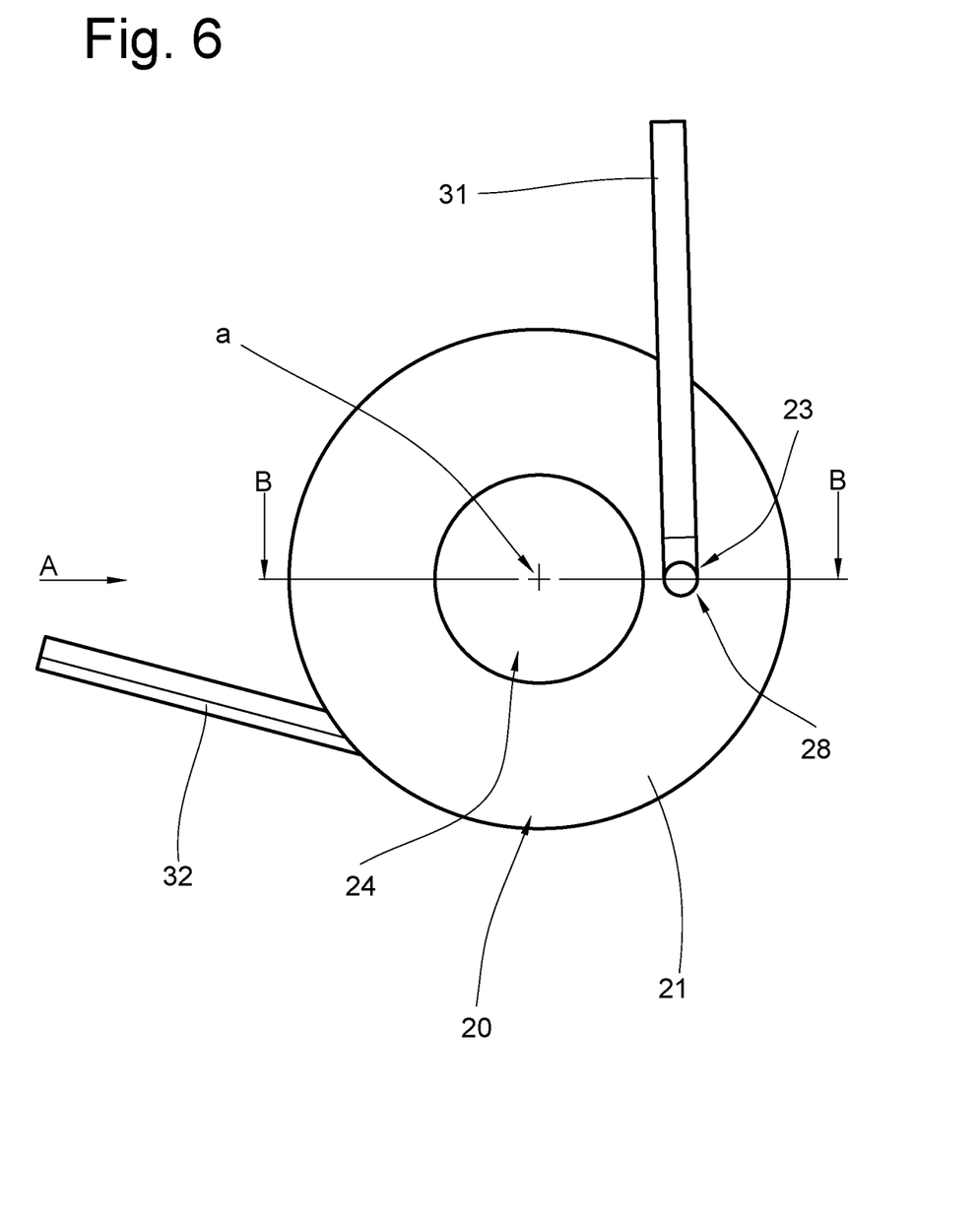

In the second position (see FIGS. 4 and 5), the longitudinal center axis of the pivot part 12 is arranged approximately vertically, for example, i.e. parallel to the z-axis, or forms an angle of up to 30° with the z-axis, for example. Between the first position and the second position, the pivot part 12 in the present embodiment covers a pivot angle of about 90°. The pivot angle may deviate therefrom in other embodiments of the invention.

In this example, the pivot part 12 has an elongated shape, with the longitudinal extension being large with respect to width and height. A frame of the pivot part 12 includes side members 19a and 19b and a cross member 16 connecting the side members 19a and 19b. A housing or padding of the pivot part 12 is not shown in FIGS.

A limitation of the movement of the pivot part 12 in the second position is effected by means of the traverse 16 which comprises opposite end regions 18a and 18b. The end portions 18a and 18b each move in a link 17 formed in the base 11. In the first position of the pivot part 12, an end portion 27 of the link 17 prevents movement in the direction u2 beyond the first position shown in FIG. 1. In the second position, there is also a stop, not shown, which in the second position prevents movement of the pivot part 12 beyond the second position in the direction u1.

The pivot part 12 comprises an end region 14 arranged near the base 11 and a free end region 15. In order to supply devices on the pivot part with power, for example, or in order to transmit data between devices arranged on the pivot part 12 and a vehicle unit, for example, a line 26 is routed between the base 11 and the pivot part 12. As a transition of the line 26 from the base 11 to the pivot part 12, the end region 14 is suitable, because here the movement of the pivot part 12 is small and the line 26 can be better protected against damage. Such a line 26 is formed, for example, by a metal cable or an optical fiber line.

In prior art devices, torsion and bending of the cable also occurred in this area, which could lead to damage to the cable under continuous load. According to the invention, such loads are prevented, which becomes clear from the following explanations.

According to the invention, the equipment part 10 comprises a guide device 20 for the line 26, which is shown in more detail as an assembly in FIGS. 6 to 12. In the present example, the guide device 20 is formed coaxially with respect to the pivot axis a. It comprises a base-fixed first part 21 and a second part 22 fixedly held to the pivot part 12. The second part 22 is pivotable relative to the first part 21.

A recess 24 is formed in the first part 21 coaxially with the central axis a, and a recess 25 is formed in the second part 22, likewise coaxially with the central axis a, through which an axle element 29 fixedly connected to the pivot part 12 passes. As can be seen in FIG. 4, the axle element 29 is mounted in a recess 34 of the base 11.

Figure 7:
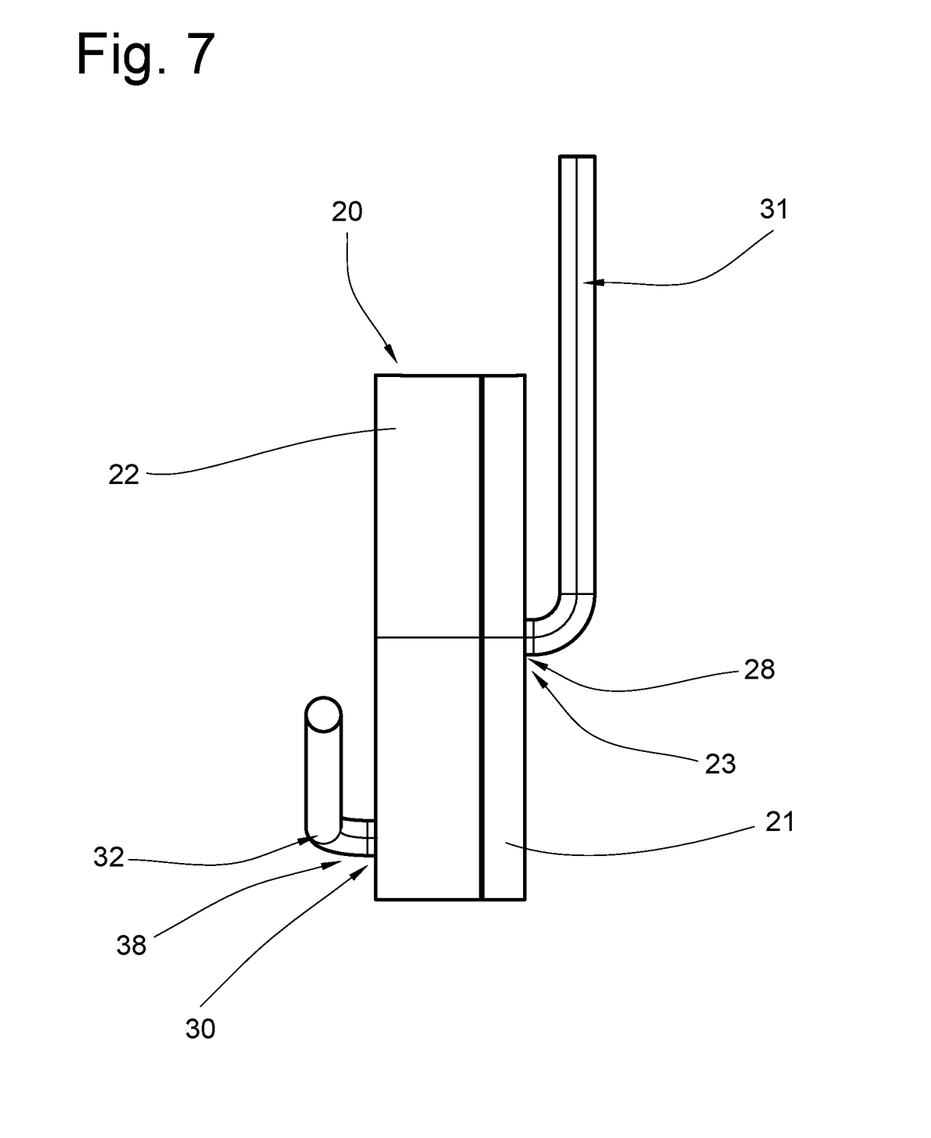

According to FIG. 7, a first portion 31 of the line 26 is connected to the first part 21 by a connection 28 and a second portion 32 of the line 26 is connected to the second part 22 by a connection 30. The connection 28 is located in the region of an axial opening 23 in the first part 21, and the connection 30 is located in the region of an axial opening 38 in the second part 22. The first portion 31 leads to the base 11 and the second portion 32 leads to the pivot part 12. Between the connection 28 of the first part 21 with the first portion 31 at and the connection 30 of the second part 22 with the second portion 32 at, a line store 33 (see FIG. 8) is formed in the form of an excess of the length of the line 26. The length of the line 26 in the line store 33 is constant.

Figure 8:
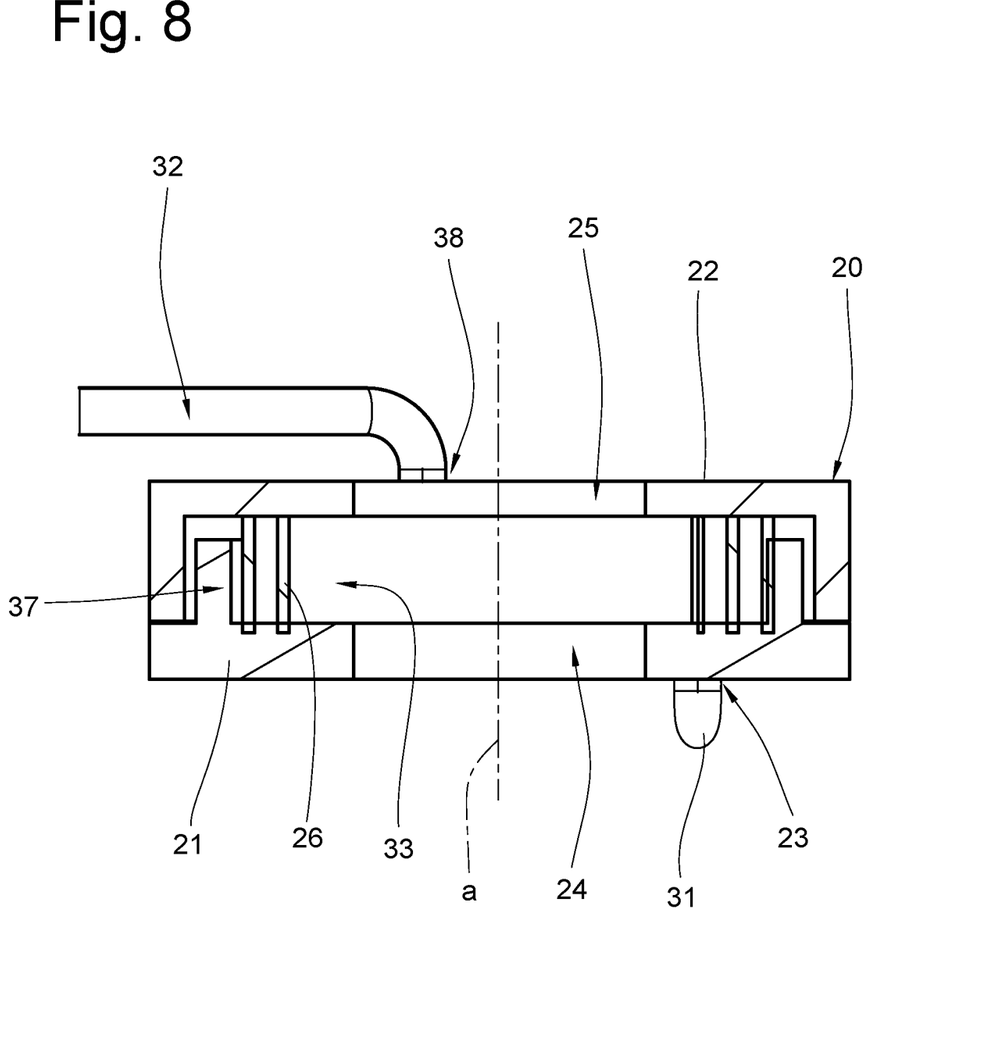

In FIG. 8, it can be seen that the part 22 is designed as a pot-shaped housing and the part 21 is cover-shaped. An annular web 37 serves to center the part 21 on the part 22. In this way, the line store 33 is protected from external influences. Such influences can be, for example, mechanical effects. Damage is prevented in this way. Also, in this way the line 26 cannot interfere with the movement of the pivot part 12 or other movable parts. Furthermore, the line store 33 is accommodated by the housing parts 20 and 21 in such a way that it can assume different states.

In the present embodiment, the line 26 into the line store 33 is wound in a substantially spiral fashion. However, it can also be arranged differently according to an alternative embodiment. It is essential that the arrangement is such that, when the portion 32 moves relative to the portion 31, only slight deformations of the portions of the line 26 in the line store 33 are caused. In particular, a deformation should be evenly distributed over a long portion extending in the longitudinal direction of the line 26 in the line store 33.

In the present embodiment, in which the line store 33 comprises a spiral winding (see FIG. 9b), the end portion 31 is closer to the pivot axis a than the end portion 32. When the first portion 21 moves relative to the second portion 22, the first portion 31 also moves relative to the second portion 32 (compare FIGS. 9b and 10b).

As an alternative to the spiral winding, a meandering laying of the line 26 can also be considered, for example.

Figure 9A:
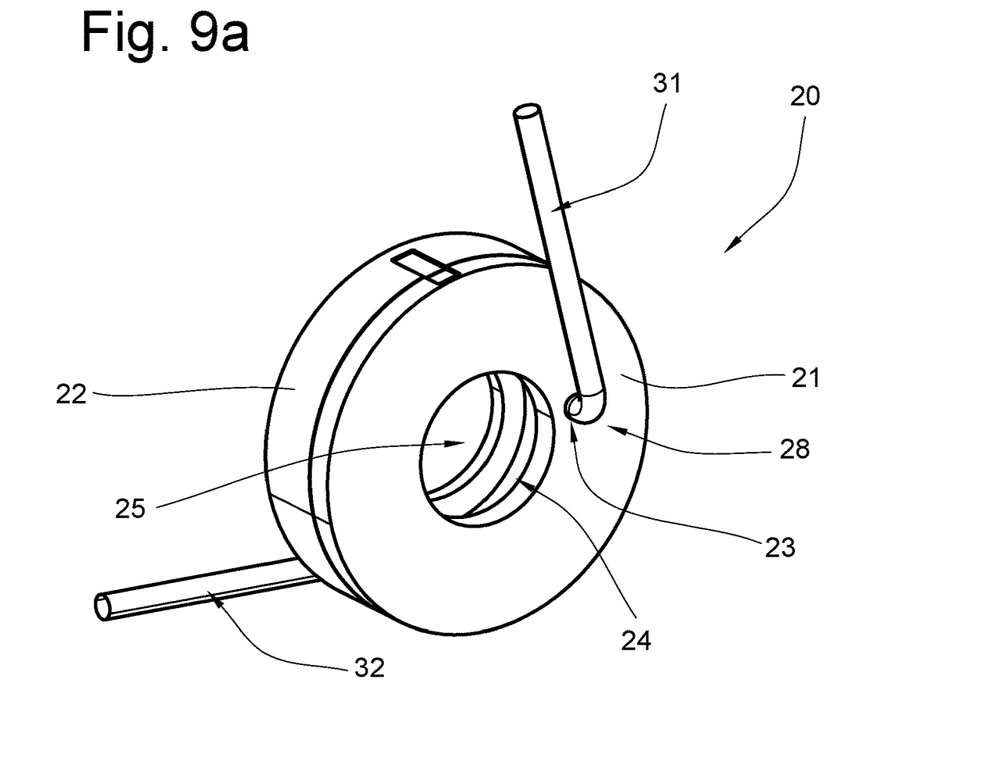
Figure 9B:
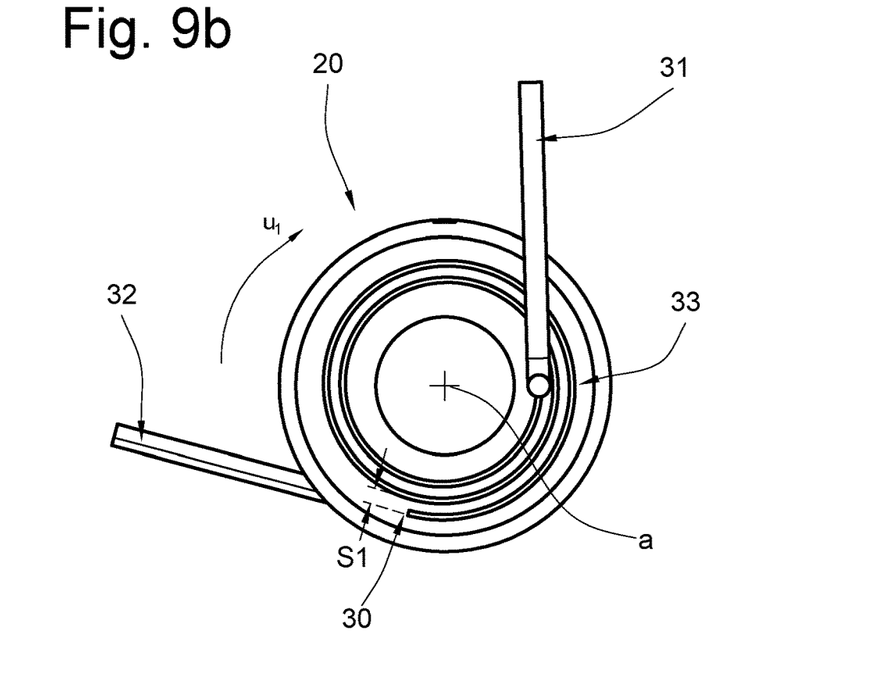

According to FIGS. 9a and 9b, for example, the pivot part 12 is in the first position. For example, the arm support of an armrest is approximately in a horizontal position. When the pivot part 12 is pivoted in the direction u1, the second part 22 and the second portion 32 move with the pivot part 12 in the direction u1, while the first portion 31 and the first part 21 are immovable relative to the base 11. According to FIG. 9b, there are 2.25 turns of the line 26 in the line store 33. A radial gap S1 is formed between the turns.

Figure 10A:
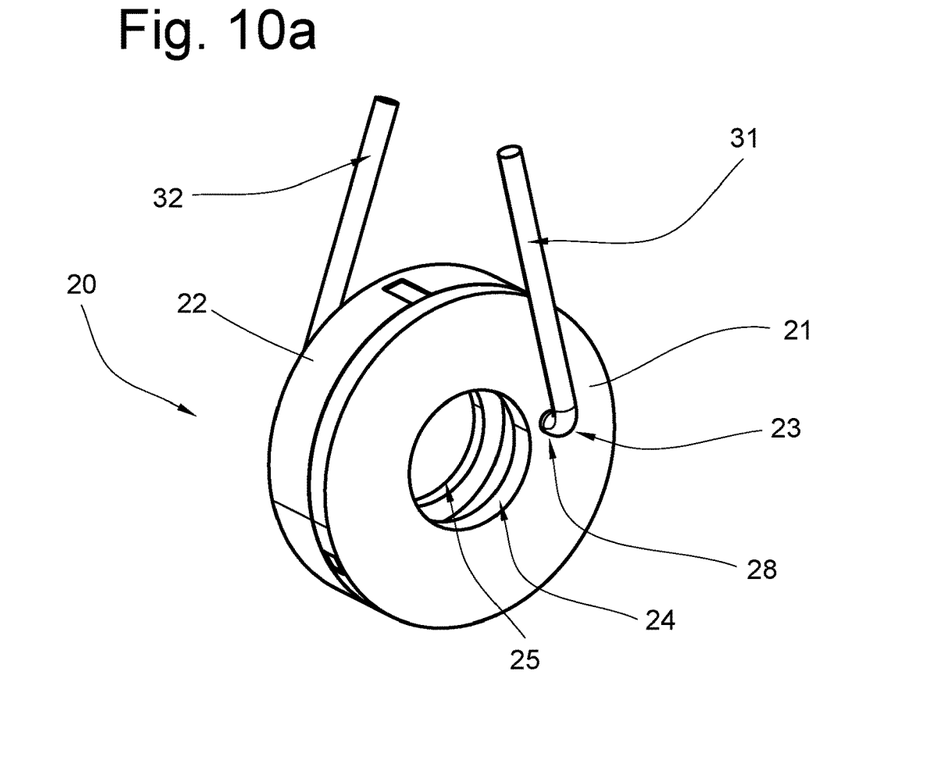
Figure 10B:
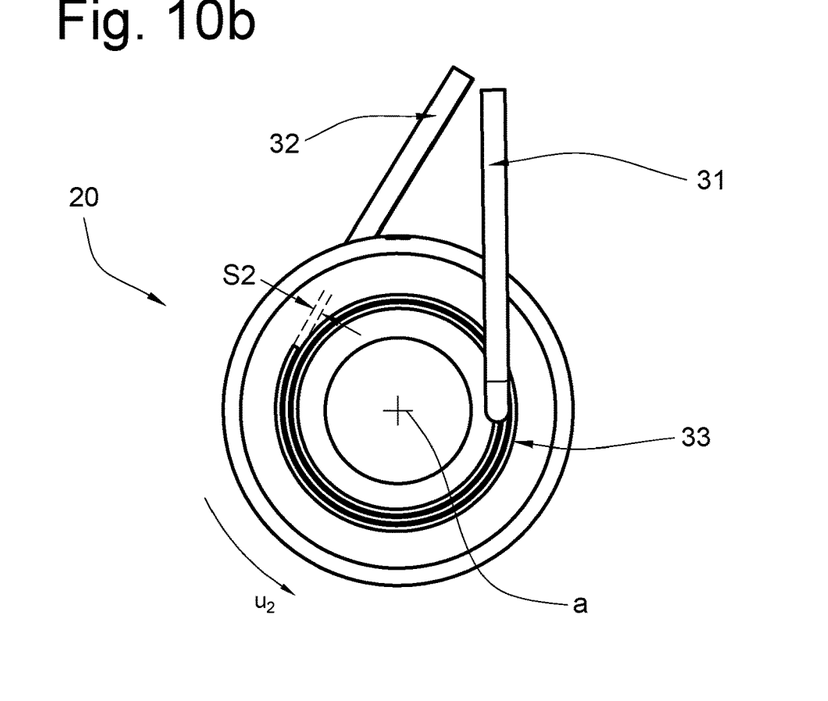
Figure 11:
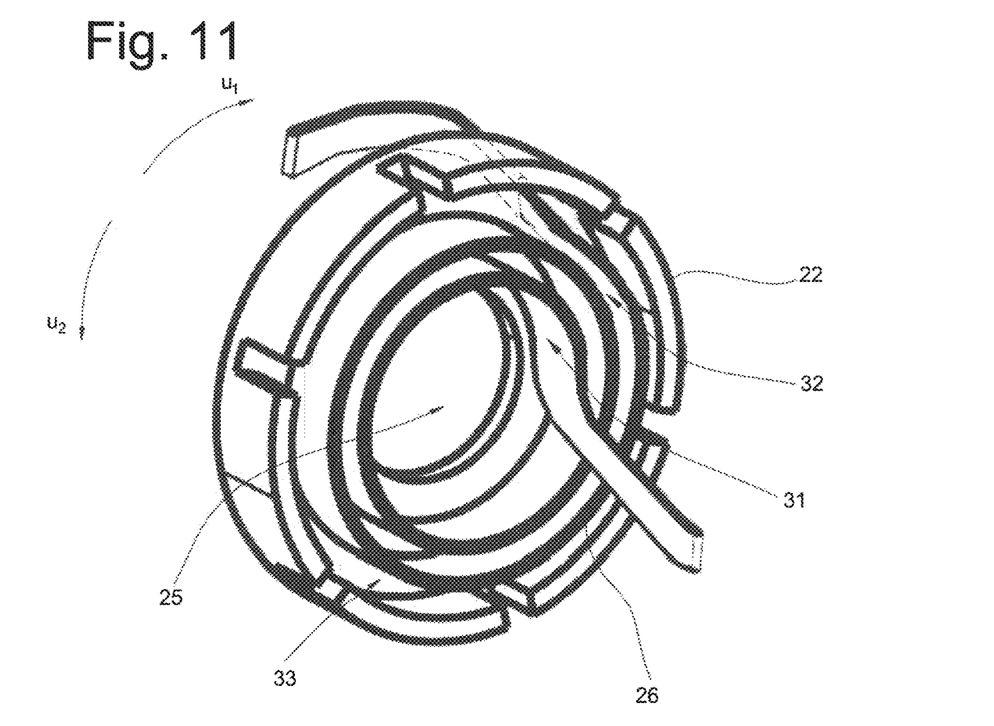
Figure 12:
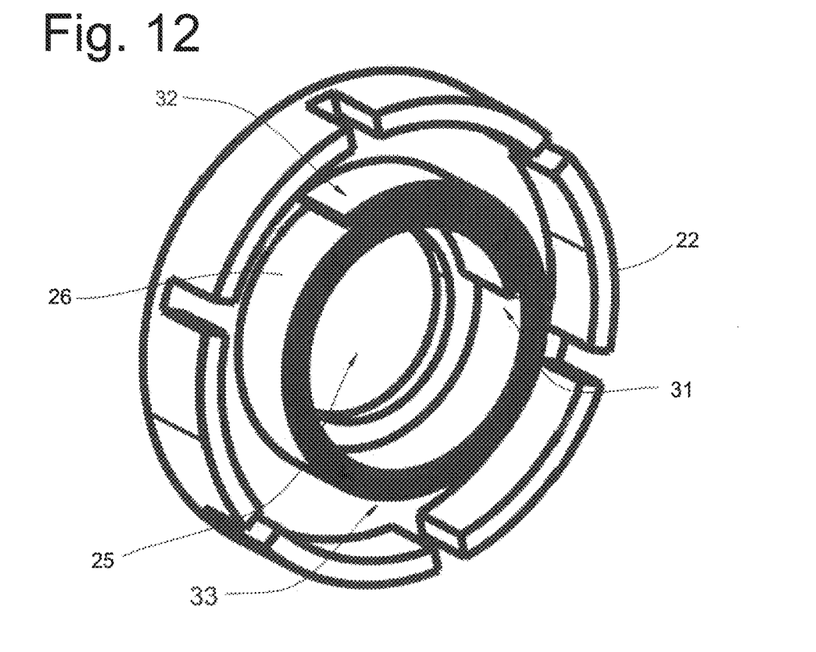

In FIGS. 10a and 10b, the guide device 20 is shown in the second position of the pivot part 12. During the movement of the pivot part 12 in the direction u1 to the second position, the area 32 is rotated by about 90° in the direction u1 from the position according to FIG. 8. Referring to FIG. 10b, the line is wound with 2.5 turns, with the radial gap between the turns decreasing from S1 to the gap S2.

The line 26 experiences only a slight deformation per length section and is not twisted or kinked. Movement of the line takes place only within the guide device 20 and exclusively in the portion of the line 26 spirally wound around the center a, while the portions of the line located outside the guide device 20 are subjected to no deformation or only very slight deformation during movement of the pivot part 12. The service life of the line is thus considerably extended.

The larger the line store 33, i.e. the longer the line 26 located in the line store 33, the lower the deformation per length section of the line 26 during a movement of the pivot part 12.

During the reverse pivoting operation of the pivot part 12 from the second position in the direction u2 to the first position, the first part 21 and the second part 22 move to the relative position shown in FIGS. 9a and 9b, with the line store 33 assuming the position shown, in which the gap S1 between the line windings is established.

It should be noted that the gap S in this exemplary embodiment is only intended to indicate different winding states, which does not necessarily mean that the gap is constant over the entire winding.

The invention claimed is:

1. An equipment part for a vehicle, comprising: a base; a pivot part that is pivotable about a pivot axis relative to the base between a first position and a second position and forms a pivot joint with the base; at least one line between the base and the pivot part, the line comprising a first portion associated with the base and a second portion associated with the pivot part; and a guide device for the line, the guide device including a first part fixed to the pivot part and forming a first connection with the first portion and a second part fixed to the base and forming a second connection with the second portion, wherein the line forms a line store between the first connection and the second connection.

2. The equipment part according to claim 1, wherein the line store is a spiral winding.

3. The equipment part according to claim 1, wherein the line store is a meandering laying of the line.

4. The equipment part according to claim 1, wherein the winding is formed about the pivot axis.

5. The equipment part according to claim 2, wherein a change in a relative position of the first connection and the second connection resulting from pivoting of the pivot part is accompanied by a change in a number of windings.

6. The equipment part according to claim 1, wherein the line is an electrical line, a light cable or a compressed air line.

7. The equipment part according to claim 1, wherein the line is a ribbon cable.

8. The equipment part according to claim 1, wherein the guide device forms a housing in which the line store is accommodated.

9. An equipment part according to claim 1, wherein the first part and/or the second part are shell-shaped.

10. The equipment part according to claim 1, wherein the first part is immovable relative to a body of the vehicle or to a vehicle reference.

11. The equipment part according to claim 1, wherein the second part is pivotable relative to the first part about the pivot axis.

12. The equipment part according to claim 1, wherein the equipment part is an armrest or a pivotable cover of a storage compartment of a console.

13. A method for forming a line store, comprising the steps of using a guide part with a line, which guide plate comprises a first part forming a first connection with a first portion of the line and a second part forming a second connection with a second portion of the line so that between the first and second connections the line forms the line store in an equipment part for a vehicle, the equipment part having a base and having a pivot part that is pivotable relative to the base between a first position and a second position about a pivot axis and forms a pivot joint with the base, wherein the line is guided between the base and the pivot part, wherein the first portion of the line is associated with the base and the second portion is associated with the pivot part, wherein the equipment part is an armrest with a pivotable arm support or a storage compartment with a pivotable cover.

* * * * *